May 30, 1961  W. L. MILLER  2,985,914
PLASTIC CUP MOLD
Filed Oct. 3, 1958  4 Sheets-Sheet 1
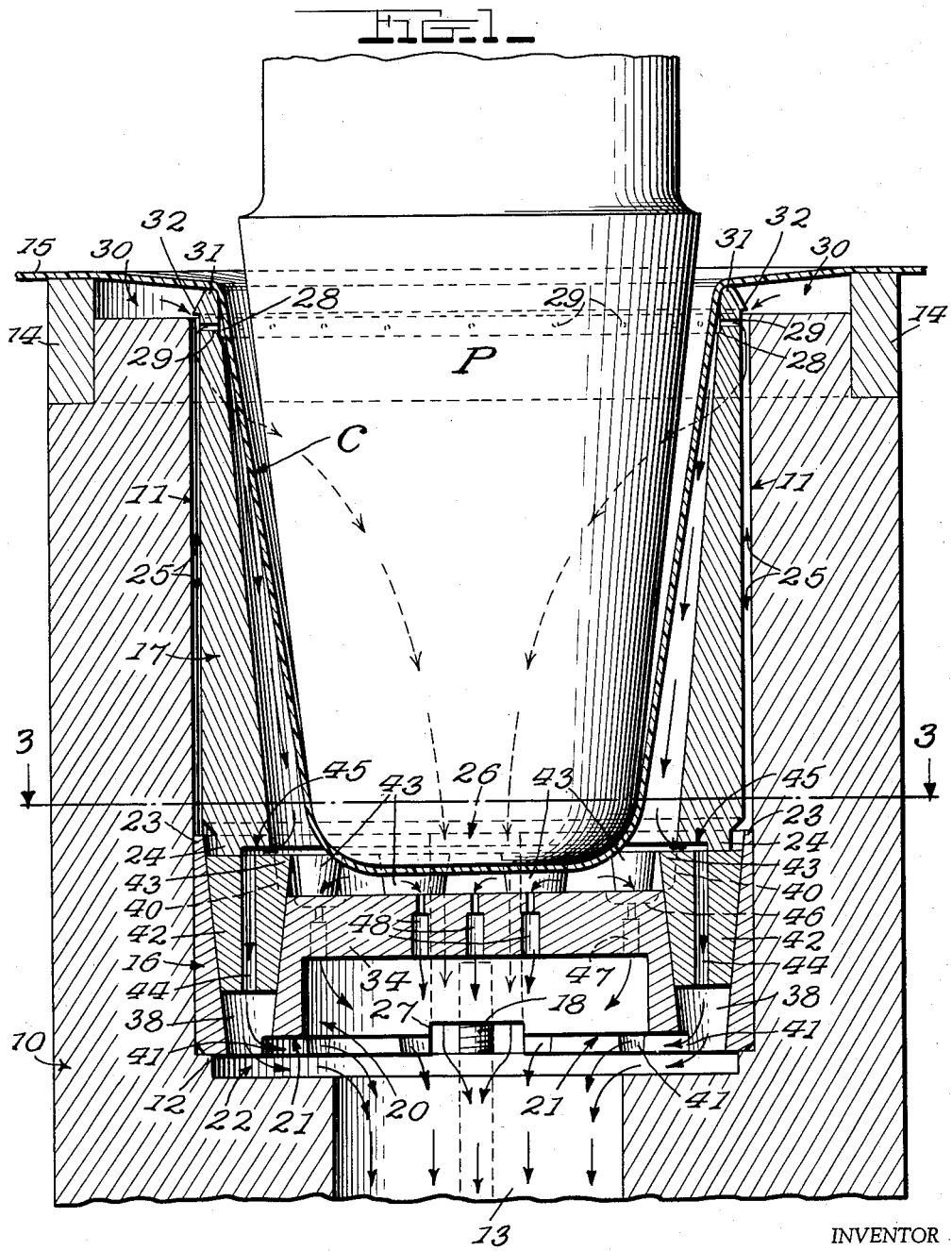
INVENTOR
W. L. Miller
BY
Mason, Porter, Diller & Stewart
ATTORNEYS

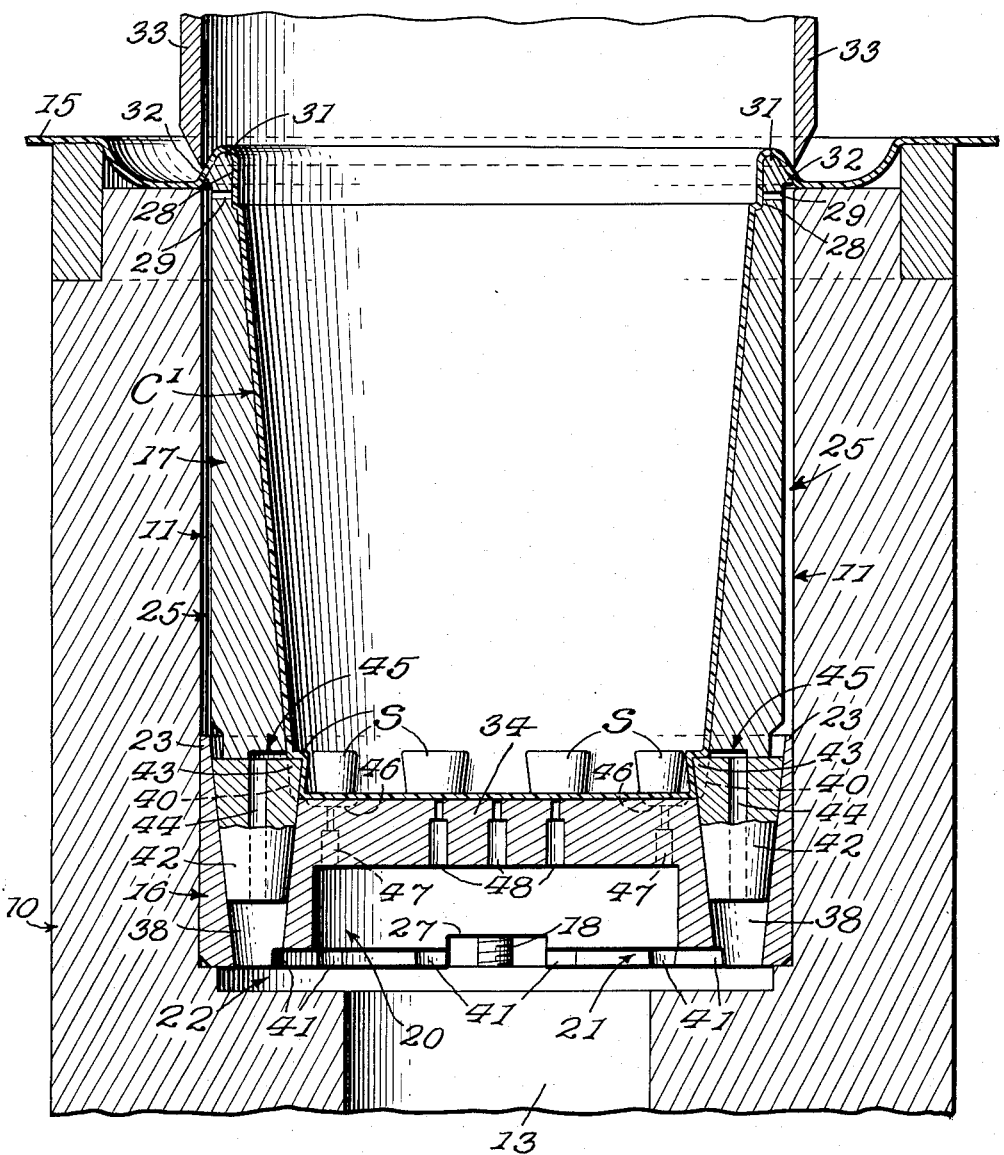

May 30, 1961  W. L. MILLER  2,985,914
PLASTIC CUP MOLD
Filed Oct. 3, 1958  4 Sheets-Sheet 3
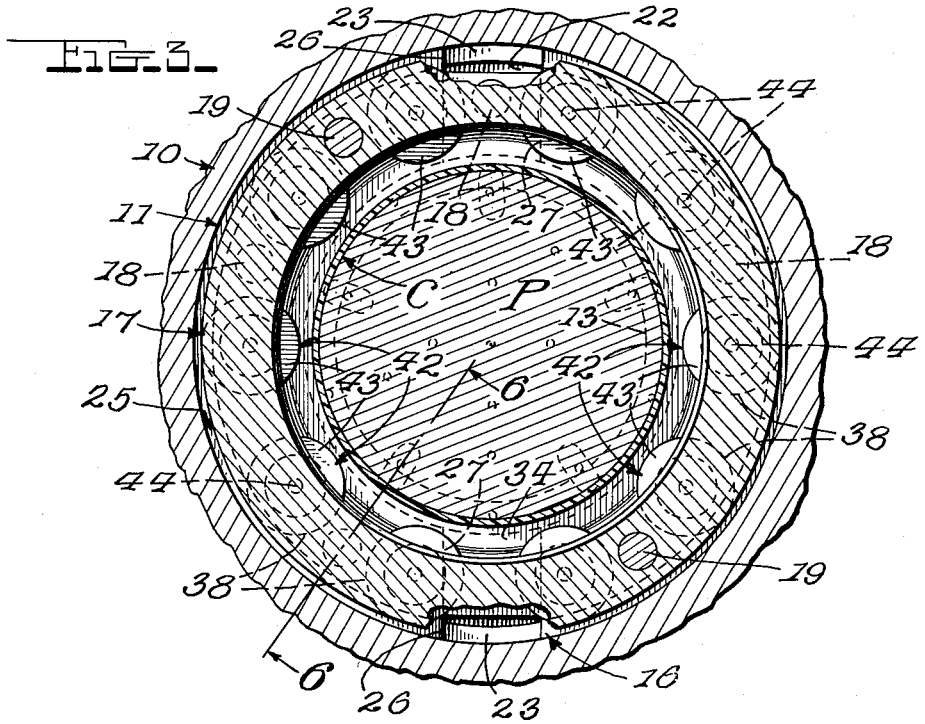
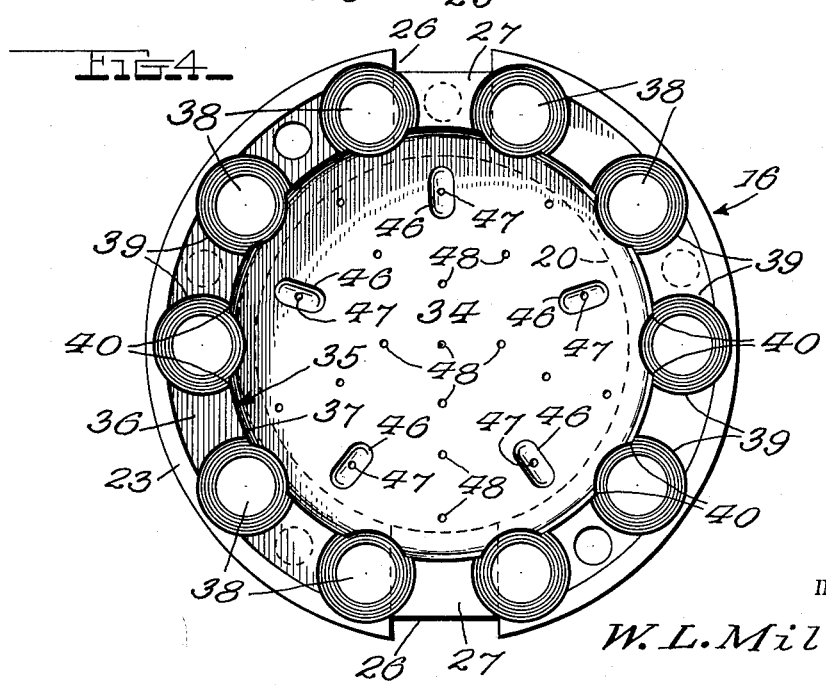
INVENTOR
W. L. Miller
BY
Mason, Porter, Diller & Stewart
ATTORNEYS May 30, 1961  W. L. MILLER  2,985,914
PLASTIC CUP MOLD
Filed Oct. 3, 1958  4 Sheets-Sheet 4
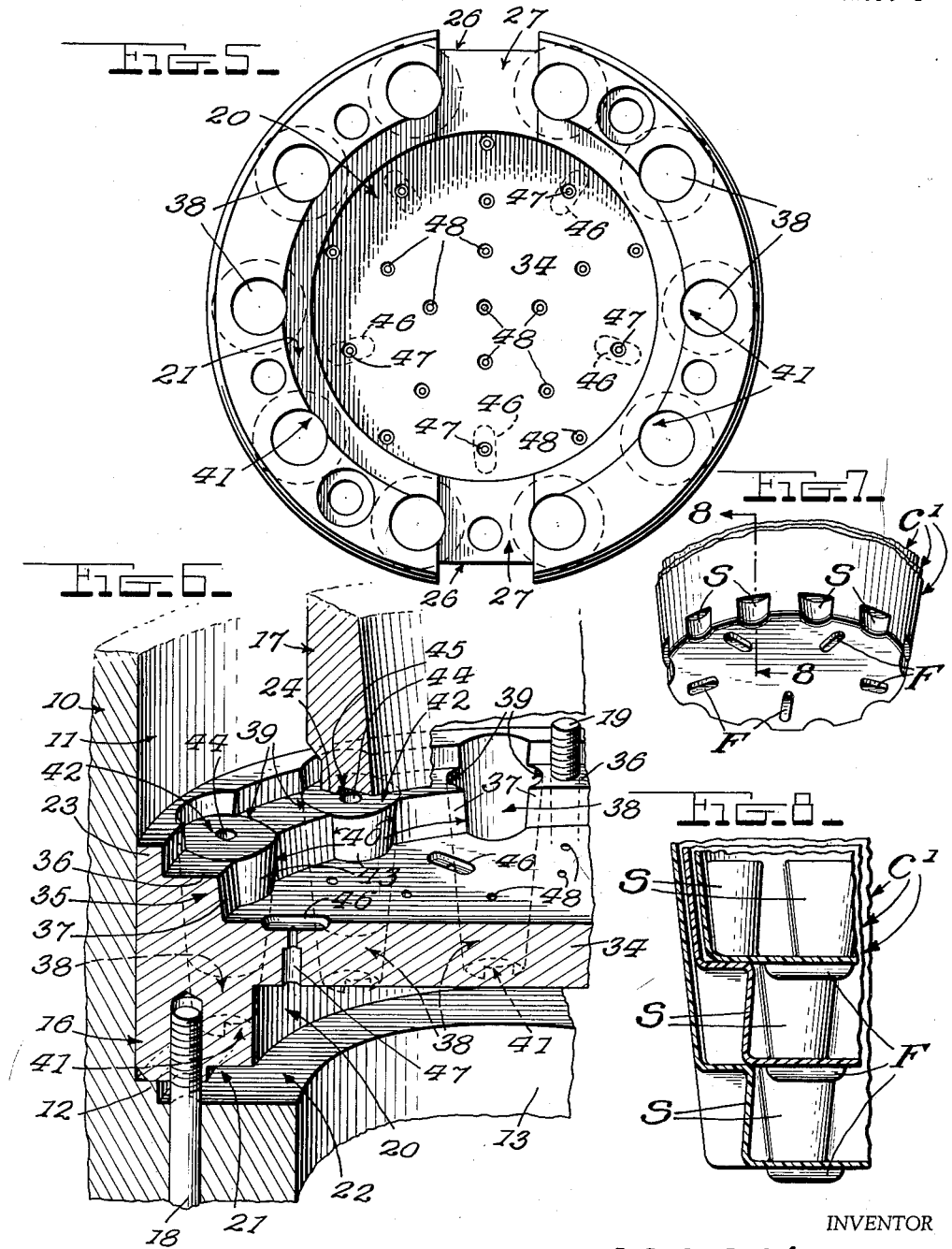
INVENTOR
W. L. Miller
BY
ATTORNEYS

United States Patent Office 2,985,914
Patented May 30, 1961

2,985,914
PLASTIC CUP MOLD
William L. Miller, Skokie, Ill., assignor to Continental Can Company, Inc., New York, N.Y., a corporation of New York
Filed Oct. 3, 1958, Ser. No. 765,099
8 Claims. (Cl. 18—19)

This invention relates to the manufacture of inexpensive plastic drinking cups somewhat similar to the paper cups now available from vending machines in such places as railway and bus terminals, auditoriums, public rest rooms, etc. Such cups are also extensively used in lunch rooms, snack bars, office suites, etc., in which cup dispensers are employed for convenience: and they are frequently used in the home.

It is customary to stack the cups in nested relation in readiness for use and the cups should be readily removable, one at a time, from the stack. This is of particular importance when vending machines or dispensers are employed, but heretofore the cups have too frequently become so tightly nested as to cause trouble.

The present invention has aimed to provide a new and improved plastic cup molding apparatus having novel construction for so shaping the cups that they cannot become tightly wedged together, thereby not only overcoming difficulties above set forth, but also preventing the nested cups from wedging tightly together during shipment.

A novel cup mold is provided into which to deform a sheet of thermo-plastic into the shape of an undersized cup: and this undersized cup is then expanded to convert it into a cup of the size and shape dictated by the mold. The expansion is accomplished, in the present disclosure by atmospheric air pressure while mechanically evacuating air from all spaces between the cup and the mold, but said expansion could well be accomplished by utilizing compressed air applied within the cup while allowing exhaust of air from the spaces between cup and mold. In either instance, the lower end of the mold side wall is equipped with circumferentially spaced inward projections which provide the side wall of the finished cup with internal steps to limit the extent to which the cups can be telescoped when stacked in nested relation: and a further object of the invention has been to make novel provision for insuring accurate conformity of spaced portions of the lower end of the cup side wall with the aforesaid projections, with no possibility of interference by air pocketing.

Another object of the invention has been to form the aforesaid inward projections by means of the upper end portions of a plurality of substantially vertical plugs embodied in the mold structure, said plugs having ducts from end to end thereof and constituting portions of the duct means through which air is exhausted from the mold during expansion of the aforesaid undersized cup.

Yet another object has been to provide the mold side wall with air exhausting duct means opening through the inner side of said wall and directly communicating with the upper ends of the aforesaid ducts of the spaced plugs.

A further object has been to provide a novel and advantageous sectional construction for the mold, including a lower section carrying the aforesaid plugs.

A still further object has been to provide a novel mold construction which may be expeditiously manufactured with conventional machine shop equipment, or may be formed with equal facility from die castings.

With the above and other objects in view that will hereinafter appear, the nature of the invention will be more clearly understood by reference to the following detailed description, the appended claims and the several views illustrated in the accompanying drawings.

In the drawings:
Figure 1 is a vertical sectional view showing the plastic sheet deformed by a plunger into the mold to the shape of an undersized cup, and indicating by arrows the exhausting of air from the mold to make possible the expansion of said undersize cup against the mold wall.

Figure 2 is a similar view but showing the cup complete except for cutting it from the plastic sheet remnant around the cup lip, and illustrating a cutter for this purpose.

Figure 3 is a horizontal sectional view on line 3—3 of Figure 1.

Figure 4 is a top plan view of the lower section of the mold with the plugs removed.

Figure 5 is a bottom plan view of the lower section of the mold with the plugs removed.

Figure 6 is a fragmentary sectional perspective view of the mold, primarily on line 6—6 of Figure 3, the plunger being omitted.

Figure 7 is a fragmentary perspective view showing a plurality of the nested cups.

Figure 8 is a typical vertical sectional view on line 8—8 of Figure 7.

While the drawings illustrate the preferred construction and this construction will be rather specifically described, it is to be understood that variations may well be made. Also, while only a single mold unit has been shown, it is to be understood that this unit could well be duplicated as many times as desired in a gang assembly.

A mold base 10 is shown as having an upwardly open socket 11, a mold supporting ledge 12 at the bottom of said socket, and an air evacuating passage 13. The body 10 is also provided with a ring 14 surrounding and spaced from the upper end of the socket 11 to support a thermoplastic sheet 15 from which a cup is to be formed.

The cup mold is disposed in the socket 11 and is composed of a lower section 16 and an upper section 17. The lower section 16 is secured on the ledge 12 by means of screws 18 (Figures 1 to 3 and 6) and the upper section 17 is secured upon said lower section by screws 19 (Figures 3 and 6). The lower side of the lower section 16 is recessed at 20 and counter-recessed at 21: and the bottom of the socket 11 is recessed at 22 in communication with the recessing 20, 21 and in communication with the air evacuating passage 13. The upper end of the lower mold section 16 has an upstanding circular rib 23: and the lower end 24 of the upper section 17 is reduced and snugly surrounded by said rib 23, to relatively center the two sections 16 and 17.

The lower section 16 fits snugly in the socket 11 but the upper section 17 is spaced at 25 from the side wall of said socket 11. The space 25 is placed in communication with the recesses 20 and 22 by means of communicating grooves 26 and 27 in the lower section 16, the grooves 26 being formed vertically in the periphery of said lower section 16 and the grooves 27 being formed radially in the bottom of said lower section.

The upper end of the upper mold section 17 is increased slightly in internal diameter as at 28: and air evacuation ducts 29 extend from this diameter enlargement to the space 25. The ducts 29 insure evacuation of air from the diameter enlargement 28 when molding the cup and thus insure that the completed cup will be internally enlarged at its lip, for cover reception. The space 25 also communicates at its upper end with the space 30 within the confines of the ring 14 and under the sheet 15 when said sheet rests on said ring and is downwardly deformed into the shape of an undersized cup as seen in Figure 1. A plunger P is shown in this view for downwardly deforming the sheet. This plunger may include provision for heating the sheet to a temperature at which it becomes plastic, or the necessary plasticity may be obtained by other suitable heating means.

When air is evacuated from the space 30, the overlying portion of the sheet 15 is bowed downwardly by atmospheric pressure around the upper end 31 of the upper mold section 17 as seen in Figure 2. This end 31 is provided with a cutter-back-up edge 32 with which a cutter 33 is cooperable to cut the completed cup from the remnant of the sheet 15.

The lower mold section 16 includes a mold bottom 34 having a peripheral upward step 35 which is cooperable with the upper mold section 17 in forming the mold side wall. The step 35 has a flat horizontal top 36, and a riser 37 extending from the upper side of the bottom 34 to said top 36. The riser 37 and the inner side of the upper mold section 17 are mutually tapered to impart the desired taper to the side wall of the completed cup.

Circumferentially spaced, downwardly tapered sockets 38 are formed in the peripheral portion of the lower mold section 16. The upper ends of these sockets 38 open at 39 through the top 36 of the step 35 and open at 40 through the riser 37. The lower ends of the sockets 38 open at 41 into the counter-recess 21.

Downwardly tapered plugs 42 are snugly fitted in the sockets 38 and have their upper end surfaces flush with the top 36 of the step 35. The upper portions of these plugs 42 project inwardly beyond the step riser 37 as seen at 43 and thus provide the lower end of the mold side wall with circumferentially spaced projections. These projections form inward steps S on the side wall of the cup C' formed by expanding the undersized cup C of Figure 1 against the mold side wall and bottom. The steps S, as seen more particularly in Figure 8, limit telescoping of the completed cups when stacking them in nested relation and therefore prevent said cups from wedging tightly together.

The plugs 42 terminate above the lower ends of the sockets 38 and said plugs have ducts 44 from end to end thereof. The lower ends of these ducts 44 open into the sockets 38. The upper ends of the ducts 44 are outwardly spaced from the inner side of the mold side wall, and duct means 45 communicates with said upper ends of said ducts 44. The duct means 45 is shown in the form of a channel between the mold sections 16 and 17 and opening through the inner side of the mold side walls.

Shallow depressions 46 are shown in the mold bottom 34 to form feet F on the completed cup C' (Figures 7 and 8). Air evacuation ducts 47 extend from these depressions to the recess 20. The bottom 34 is also formed with various other ducts 48 from its upper side to the recess 20. The ducts 47 and 48 (see arrows in Figure 1) insure evacuation of air from the lower portion of the mold while evacuation is occurring from other mold portions through the duct means formed by the ducts 29, space 25, channel 45, plug ducts 44, etc. The channel 45 and ducts 44 insure that no air can be pocketed at the upper ends of the plugs 42 to interfere with proper shaping of the steps S by the plug portions 43. All ducts subjected to the plastic are of course sufficiently restricted to prevent appreciable entrance of plastic.

*Operation*

The thermo-plastic sheet 15 is placed on the ring 14, heated to plastic condition and downwardly deformed by the plunger P to form the undersize cup C of Figure 1. Evacuation of air is then effected by establishing vacuum pull on the passage 13. As such evacuation occurs, the cup C is expanded by atmospheric pressure and is converted to a full-sized cup C' which is shaped accurately by the mold and provided with the internal steps S. When the plastic has set, the cutter 33 is operated to cut the cup from the sheet remnant surrounding the cup lip and the completed cup C' is then pneumatically or otherwise ejected. When stacking a plurality of the cups in nested relation, the steps S limit telescoping no matter how much adjacent cups may be turned with respect to each other. Tight wedging of the nested cups together is therefore prevented and prior difficulties are consequently overcome.

Attention is again invited to the possibility of making variations within the scope of the invention.

I claim:

1. In a molding apparatus in which a plastic sheet is deformed into the shape of an undersized cup and in which this undersized cup is expanded and shaped into the form of a full-sized cup, a mold base, a lower mold section secured to said base, said lower mold section comprising a mold bottom having a continuous upward step at its peripheral portion, said step having a flat top and a riser extending to said flat top from the upper surface of said bottom, said peripheral portion of said mold bottom and said step having circumferentially spaced vertically elongated sockets which open upwardly through said flat top of said step and open laterally through said riser of said step, replaceable plugs removably seated in said circumferentially spaced sockets and having upper end surfaces flush with said top of said step, said plugs having peripheral portions projecting inwardly from said riser of said step to form inward steps on the cup to be molded, and an upper mold section secured upon said lower mold section and having an inner peripheral side coacting with said riser in forming a mold side wall; said mold side wall, said mold bottom and said inwardly projecting plug portions cooperating in forming a complete mold to receive the plastic undersized cup and to shape the full-sized cup formed by expansion of said undersized cup; said mold having air exhausting duct means making possible the expansion of the undersized cup into contact with said mold.

2. A structure as specified in claim 1, in which said duct means includes ducts extending through said plugs from end to end thereof, said duct means also including duct means between said mold sections, communicating with the upper ends of said ducts and opening through the inner peripheral side of said mold side wall.

3. A structure as specified in claim 1, in which said duct means includes ducts extending through the aforesaid plugs from end to end thereof, said duct means also including a circumferentially extending channel between the lower end of said upper mold section and the flush upper surfaces of said step and plugs, said channel opening through the inner peripheral side of the mold side wall and being in direct communication with the upper ends of said ducts of said plugs.

4. A structure as specified in claim 1, in which an air exhausting recess is provided between said lower insert and said mold base, the lower ends of said circumferentially spaced sockets being in communication with said recess, the lower ends of said plugs being disposed above said lower ends of said sockets, said plugs having ducts from end to end thereof and constituting portions of said duct means.

5. A structure as specified in claim 1, in which an air exhausting recess is provided between said lower insert and said mold base, the lower ends of said circumferentially spaced sockets being in communication with said recess, the lower ends of said plugs being disposed above said lower ends of said sockets, said plugs having ducts from end to end thereof and constituting portions of said duct means, said duct means also including duct means between said mold sections, communicating with the upper ends of said ducts and opening through the inner peripheral side of said mold side wall.

6. A structure as specified in claim 1, in which an air exhausting recess is provided between said lower insert and said mold base, the lower ends of said circumferentially spaced sockets being in communication with said recess, the lower ends of said plugs being disposed above said lower ends of said sockets, said plugs having ducts from end to end thereof and constituting portions of said duct means, said duct means also including a circumferentially extending channel between the lower end of said upper mold section and the flush upper surfaces of said step and plugs, said channel opening through the inner peripheral side of the mold side wall and being in direct communication with the upper ends of said ducts of said plugs.

7. A mold for forming a thin wall plastic cup through an air pressure differential shaping method wherein the plastic cup so formed will have a lower side wall portion provided with inward steps to limit nesting, said mold comprising a lower mold section and an upper mold section, said lower mold section having a central bottom defining portion and a circumferential step including a riser and a top, said mold step having circumferentially spaced upright sockets opening upwardly through said top and laterally through said riser, a replaceable plug seated in each of said sockets and having an upper portion thereof projecting inwardly of said riser in overlying relation to said bottom defining portion, at least certain of said plugs having means for evacuating air therethrough, said upper mold section being seated on said mold step, and means releasably securing said upper mold section to said bottom mold section with said upper mold section holding said plugs in place.

8. A mold for forming a thin wall plastic cup through an air pressure differential shaping method wherein the plastic cup so formed will have a lower side wall portion provided with inward steps to limit nesting, said mold comprising a lower mold section and an upper mold section, said lower mold section having a central bottom defining portion and a circumferential step including a riser and a top, said mold step having circumferentially spaced upright sockets opening upwardly through said top and laterally through said riser, a replaceable plug seated in each of said sockets and having an upper portion thereof projecting inwardly of said riser in overlying relation to said bottom defining portion, at least certain of said plugs having means for evacuating air therethrough, said upper mold section being seated on said mold step, and means releasably securing said upper mold section to said bottom mold section with said upper mold section holding said plugs in place, said upper mold section having an inner cup body defining surface aligned with and forming an upward continuation of said riser, the underside of said upper mold section having an air exhausting recess directly overlying said plugs and being exhausted therethrough.

References Cited in the file of this patent

UNITED STATES PATENTS

| | | |
|---|---|---|
| 2,736,065 | Wilcox | Feb. 28, 1956 |
| 2,749,572 | Nowak | June 12, 1956 |
| 2,797,439 | Borkland | July 2, 1957 |
| 2,832,094 | Groth | Apr. 29, 1958 |

FOREIGN PATENTS

| | | |
|---|---|---|
| 1,107,267 | France | Aug. 3, 1955 |
| 1,134,142 | France | Nov. 26, 1956 |
| 301,465 | Switzerland | Nov. 16, 1954 |